(12) United States Patent
Kim

(10) Patent No.: US 10,545,662 B2
(45) Date of Patent: Jan. 28, 2020

(54) METHOD FOR CONTROLLING TOUCH SENSING MODULE OF ELECTRONIC DEVICE, ELECTRONIC DEVICE, METHOD FOR OPERATING TOUCH SENSING MODULE PROVIDED IN ELECTRONIC DEVICE, AND TOUCH SENSING MODULE

(71) Applicant: Samsung Electronics Co., Ltd., Suwon-si, Gyeonggi-do (KR)

(72) Inventor: Byeong-Jae Kim, Dongducheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/737,889

(22) PCT Filed: Jun. 23, 2016

(86) PCT No.: PCT/KR2016/006708
§ 371 (c)(1),
(2) Date: Dec. 19, 2017

(87) PCT Pub. No.: WO2016/209004
PCT Pub. Date: Dec. 29, 2016

(65) Prior Publication Data
US 2018/0300051 A1    Oct. 18, 2018

(30) Foreign Application Priority Data

Jun. 25, 2015 (KR) .................. 10-2015-0090614

(51) Int. Cl.
*G06F 3/0488* (2013.01)
*G06F 3/01* (2006.01)

(52) U.S. Cl.
CPC .......... *G06F 3/04883* (2013.01); *G06F 3/017* (2013.01)

(58) Field of Classification Search
CPC ........ G06F 3/017; G06F 3/0416; G06F 3/044; G06F 3/04883
See application file for complete search history.

(56) References Cited

U.S. PATENT DOCUMENTS

| 8,751,972 | B2 | 6/2014 | Ouyang et al. |
| 8,830,181 | B1 | 9/2014 | Clark et al. |
| 2008/0158174 | A1 | 7/2008 | Land et al. |
| 2009/0243998 | A1* | 10/2009 | Wang .................. G06F 3/04883 345/156 |
| 2014/0019674 | A1 | 1/2014 | Park |
| 2014/0109020 | A1 | 4/2014 | Wielgosz |

(Continued)

FOREIGN PATENT DOCUMENTS

WO    2012/091234 A1    7/2012

*Primary Examiner* — Viet D Pham
(74) *Attorney, Agent, or Firm* — Jefferson IP Law, LLP

(57) ABSTRACT

An electronic device having a touch sensing module according to an embodiment of the present invention comprises: a touch sensing module; a non-volatile memory for storing gesture information, which has gesture types defined according to signal values that are to be output from the touch sensing module, in order to determine a gesture type input by the user on the touch sensing module; and a host control unit for transmitting the gesture information, which is stored in the non-volatile memory, to a volatile memory of the touch sensing module when the touch sensing module is reset.

15 Claims, 9 Drawing Sheets

(56) References Cited

U.S. PATENT DOCUMENTS

2014/0327631 A1    11/2014   Park et al.
2015/0106762 A1    4/2015   Bell et al.
2015/0169123 A1    6/2015   Lee et al.

* cited by examiner

| GESTURE FORM | GESTURE TYPE | FUNCTION |
|---|---|---|
| | TOUCH GESTURE | SELECT CONTENT |
| TAP TAP | TOUCH GESTURE | SWITCH BETWEEN SCREENS |
| | DRAG GESTURE | CHANGE CONTENT<br>CHANGE PAGE<br>MOVE SCROLL BAR |
| | PINCH GESTURE | ENLARGE CONTENT |
| | FIRST USER-DEFINED GESTURE | ENTER HOME SCREEN |
| | FOURTH USER-DEFINED GESTURE | UNLOCK SCREEN |
| | SECOND USER-DEFINED GESTURE | SHARE CURRENT PAGE |
| | THIRD USER-DEFINED GESTURE | BOOKMARK CURRENT PAGE |

FIG.3

METHOD FOR CONTROLLING TOUCH SENSING MODULE OF ELECTRONIC DEVICE, ELECTRONIC DEVICE, METHOD FOR OPERATING TOUCH SENSING MODULE PROVIDED IN ELECTRONIC DEVICE, AND TOUCH SENSING MODULE

PRIORITY

This application is a National Phase Entry of PCT International Application No. PCT/KR2016/006708, which was filed on Jun. 23, 2016, and claims a priority to Korean Patent Application No. 10-2015-0090614, which was filed on Jun. 25, 2015, the contents of which are incorporated herein by reference.

TECHNICAL FIELD

The present invention relates to a method for an electronic device to control a touch-sensing module.

Particularly, the present invention relates to a method for an electronic device to control a touch-sensing module in order to determine the type of a gesture input by a user onto the touch-sensing module.

BACKGROUND ART

A touch-sensing module provided in an electronic device is an input device for sensing the position of a user's hand or a tool that touches or approaches the electronic device.

An ordinary touch-sensing module may include a touch panel that generates signal values based on the touch or approach of an input tool (for example, a finger, a stylus pen, or the like), and the touch panel may be connected to a touch-sensing module controller by a wire. The touch-sensing module controller may sense a change in signal values of the touch panel based on the touch or approach of the input tool and may determine user-input information, such as the position of a touch by a user's finger on the touch panel or the number of touches. Subsequently, the touch-sensing module controller may determine the gesture type based on the user-input information. In this case, the touch-sensing module controller may determine the gesture type using a gesture database stored in flash memory included in the touch-sensing module. When the gesture type is determined, the touch-sensing module controller may transmit information on the determined gesture type to the electronic device.

DETAILED DESCRIPTION OF THE INVENTION

Technical Problem

When a touch-sensing module provided in an electronic device determines a gesture type using a gesture database stored in flash memory included in the touch-sensing module, a problem may occur in operation of the touch-sensing module depending on the durability of the flash memory. For example, since there is a limit on the number of read or write operations that the flash memory can perform, the number of uses of the gesture database stored in the flash memory may be limited. Further, an error in an algorithm for determining a gesture type or a collision of the algorithm with other functions may cause an unexpected error when using the flash memory.

Therefore, an aspect of the present invention aims to provide a method for an electronic device to control a touch-sensing module, thereby guaranteeing the robustness of a gesture database used to determine a gesture type.

A method or a device according to various embodiments of the present invention may solve the foregoing problems. In addition, other problems obvious to those having ordinary knowledge in the art may be solved in view of details explained in the present invention.

Technical Solution

An electronic device having a touch-sensing module according to one embodiment of the present invention includes: a touch-sensing module; a nonvolatile memory that stores gesture information, in which gesture types based on signal values to be output from the touch-sensing module are defined, in order to determine the type of gesture input by a user onto the touch-sensing module; and a host control unit that transmits the gesture information stored in the nonvolatile memory to a volatile memory of the touch-sensing module when the touch-sensing module is reset.

The touch-sensing module may be reset when the electronic device is booted up, when a screen of the touch-sensing module switches from an off state to an on state, or when the touch-sensing module malfunctions.

When event information indicating a reset state of the touch-sensing module is received from the touch-sensing module, the host control unit may transmit the gesture information stored in the nonvolatile memory to the volatile memory of the touch-sensing module.

The host control unit may obtain information on the type of gesture input by the user, which is recognized using the gesture information, from the touch-sensing module.

The gesture information may be gesture information, in which gesture types based on pieces of user-input information derived from signal values to be output from a touch panel of the touch-sensing module are defined.

The signal values may be at least one of a capacitance value, a voltage value, and a current value output from a touch panel based on the user input.

The user-input information may be at least one of a position of a touch, a touch-off position, a number of touches, coordinates of a touch, a touch strength, a touch time, a touch movement speed, a trajectory of a touch, a touch movement direction, an area of a touch, and an angle of a touch based on the user input on the touch-sensing module.

The type of gesture may be at least one of a touch gesture, a drag gesture, a pinch gesture, a swipe gesture, a long touch gesture, a multi-touch gesture, a knock-on gesture, a user-defined gesture, and a knock-code user-defined gesture.

A touch-sensing module provided in an electronic device according to another embodiment of the present invention includes: a touch panel that outputs touch signals; an interface that performs communication with the host control unit of the electronic device; and a touch-sensing module controller that receives gesture information, in which gesture types based on signal values to be output from the touch panel are defined, from the host control unit through the interface and stores the gesture information in the volatile memory of the touch-sensing module when the touch-sensing module is reset.

The touch-sensing module controller may transmit event information indicating a reset state of the touch-sensing module to the host control unit through the interface when the touch-sensing module is reset.

The touch-sensing module controller may determine the type of gesture input by the user onto the touch-sensing module using the gesture information stored in the volatile memory, and may transmit information on the determined type of gesture to the host control unit through the interface.

A method for controlling, by an electronic device, a touch-sensing module according to still another embodiment of the present invention includes: maintaining gesture information, in which gesture types based on signal values to be output from a touch-sensing module are defined, in a nonvolatile memory in order to determine the type of gesture input by a user onto the touch-sensing module; and transmitting the gesture information maintained in the nonvolatile memory to a volatile memory of the touch-sensing module when the touch-sensing module is reset.

The touch-sensing module may be reset when the electronic device is booted up, when a screen of the touch-sensing module switches from an off state to an on state, or when the touch-sensing module malfunctions.

The transmitting of the gesture information to the volatile memory of the touch-sensing module may be transmitting the gesture information stored in the nonvolatile memory to the volatile memory of the touch-sensing module when event information indicating a reset state of the touch-sensing module is received from the touch-sensing module.

The method for controlling the touch-sensing module may further include obtaining information on the type of gesture input by the user, which is recognized using the gesture information, from the touch-sensing module.

The gesture information may be gesture information, in which gesture types based on pieces of user-input information derived from signal values to be output from a touch panel of the touch-sensing module are defined.

The signal values may be at least one of a capacitance value, a voltage value, and a current value output from a touch panel based on the user input.

The user-input information may be at least one of a position of a touch, a touch-off position, a number of touches, coordinates of a touch, a touch strength, a touch time, a touch movement speed, a trajectory of a touch, a touch movement direction, an area of a touch, and an angle of a touch based on the user input on the touch-sensing module.

The type of gesture may be at least one of a touch gesture, a drag gesture, a pinch gesture, a swipe gesture, a long touch gesture, a multi-touch gesture, a knock-on gesture, a user-defined gesture, and a knock-code user-defined gesture.

A method for operating a touch-sensing module provided in an electronic device according to yet another embodiment of the present invention includes: transmitting event information indicating a reset state of the touch-sensing module to a host control unit when the touch-sensing module is reset.

The method for operating the touch-sensing module may include: receiving, as a result of transmitting the event information, gesture information, in which gesture types based on signal values to be output from a touch panel of the touch-sensing module are defined, from the host control unit; and storing the received gesture information in the volatile memory of the touch-sensing module.

The method for operating the touch-sensing module may further include: determining the type of gesture input by the user onto the touch-sensing module using the gesture information stored in the volatile memory; and transmitting information on the determined type of gesture to the host control unit.

Advantageous Effects

According to various embodiments of the present invention, it is possible to update a gesture database in a volatile memory included in a touch-sensing module when necessary using a gesture database stored in a nonvolatile memory of an electronic device.

Further, when the touch-sensing module is reset, the gesture database may be safely stored using the gesture database stored in the nonvolatile memory of the electronic device.

In addition, since the gesture database is stored in the nonvolatile memory of the electronic device, it is possible to update and manage the gesture database even when the touch-sensing module is turned off.

In addition, other effects obtained or expected by embodiments of the present invention will be directly or implicitly disclosed in the detailed description of the embodiments of the present invention. For example, various effects expected according to embodiments of the present invention will be disclosed in the detailed description to be described later.

BRIEF DESCRIPTION OF DRAWINGS

FIG. 3 illustrates gesture types based on user input.

MODE FOR CARRYING OUT THE INVENTION

Figure 1:
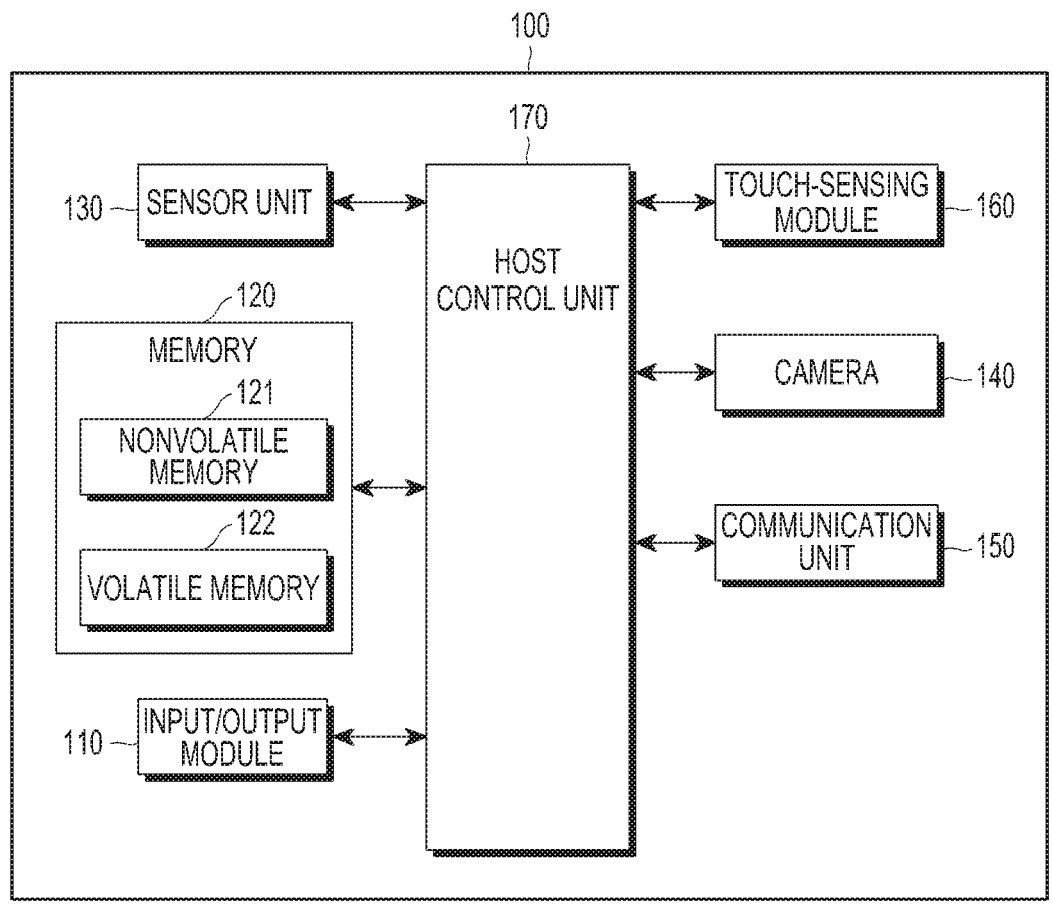
FIG. 1 illustrates an electronic device according to one embodiment of the present invention.

The present invention may have various modifications and various embodiments, among which specific embodiments will now be described more fully with reference to the accompanying drawings. However, it should be understood that the present invention is not limited to the specific embodiments, but the present invention includes all modifications, equivalents, and alternatives within the spirit and the scope of the present invention.

Although the terms including an ordinal number such as first, second, etc. can be used for describing various elements, the structural elements are not restricted by the terms. The terms are used merely for the purpose to distinguish an element from the other elements. For example, a first element could be termed a second element, and similarly, a second element could be also termed a first element without departing from the scope of the present invention. As used herein, the term "and/or" includes any and all combinations of one or more associated items.

The terms used in this application is for the purpose of describing particular embodiments only and is not intended to limit the invention. As used herein, the singular forms are intended to include the plural forms as well, unless the context clearly indicates otherwise. In the description, it should be understood that the terms "include" or "have" indicate existence of a feature, a number, a step, an operation, a structural element, parts, or a combination thereof, and do not previously exclude the existences or probability of addition of one or more another features, numeral, steps, operations, structural elements, parts, or combinations thereof.

In embodiments of the present invention, the term "module" or "unit" may perform at least one function or operation, and may be implemented by hardware, software, or a combination of hardware and software. Further, a plurality of "modules" or "units" may be integrated into at least one module and be implemented as at least one processor (not shown), except for "modules" or "units" that need to be implemented by specific hardware.

In embodiments of the present invention, when it is described that an element is "connected" to another element, not only the first element may be "connected directly" to the second element, but the first element may also be "electrically connected" to the second element while a third element is interposed therebetween.

Unless defined differently, all terms used herein, which include technical terminologies or scientific terminologies, have the same meaning as that understood by a person skilled in the art to which the present invention belongs. It should be interpreted that the terms, which are identical to those defined in general dictionaries, have the meaning identical to that in the context of the related technique. The terms should not be ideally or excessively interpreted as a formal meaning.

In the present invention, an electronic device may be a random device, and the electronic device may be called a terminal, a portable terminal, a mobile terminal, a communication terminal, a portable communication terminal, a portable mobile terminal, a display device or the like For example, the electronic device may be a smart phone, a portable phone, a navigation device, a game console, a Television (TV), a notebook computer, a laptop computer, a Tablet computer, a Personal Media Player (PMP), a Personal Digital Assistants (PDA), and the like. The electronic device may be implemented as a portable communication terminal which has a wireless communication function and a pocket size. Further, the electronic device may be a flexible device or a flexible display device.

The electronic device may communicate with an external electronic device, such as a server or the like, or perform an operation through an interworking with the external electronic device. For example, the electronic device may transmit an image photographed by a camera and/or position information detected by a sensor unit to the server through a network. The network may be a mobile or cellular communication network, a Local Area Network (LAN), a Wireless Local Area Network (WLAN), a Wide Area Network (WAN), an Internet, a Small Area Network (SAN) or the like, but is not limited thereto.

FIG. 1 illustrates an electronic device according to one embodiment of the present invention. FIG. 1 illustrates a representative configuration of an electronic device, in which some components may be omitted or modified if necessary.

The electronic device 100 may include an input/output module 110, a memory 120, a sensor unit 130, a camera 140, a communication unit 150, a touch-sensing module 160, and a host control unit 170.

The input/output module 110 is a tool for receiving user input or reporting information to a user, and may include a plurality of buttons, a microphone, a speaker, a vibration motor, a connector, a keypad, a mouse, a trackball, a joystick, cursor direction keys, or a cursor control.

The buttons may be formed on the front side, a lateral side, and/or the rear side of the electronic device 100, and may include a power/lock button, a volume button, a menu button, a home button, a back button, or a search button.

The microphone receives a voice or sound and generates an electrical signal under the control of the host control unit 170.

The speaker may output a sound corresponding to various signals (e.g., a radio signal, a broadcast signal, a digital audio file, a digital video file, or photographing) to the outside of the electronic device 100 under the control of the host control unit 170. The speaker may output a sound corresponding to a function performed by the electronic device 100. One or a plurality of speakers may be formed at an appropriate location or appropriate locations of the electronic device 100.

The vibration motor may convert an electrical signal into mechanical vibrations under the control of the host control unit 170. For example, when the electronic device 100 in the vibration mode receives a voice call from another electronic device (not shown), the vibration motor operates. One or a plurality of vibration motors may be formed in the electronic device 100. The vibration motor may operate in response to a touch motion of the user touching the touch-sensing module 160 and a continuous movement of a touch on the touch-sensing module 160.

The connector may be used as an interface for connecting the electronic device 100 to a server, an external electronic device, or a power source. Data stored in the memory 120 of the electronic device 100 may be transmitted to the external device, or data may be received from the external device through a wired cable connected to the connector under the control of the host control unit 170. Power may be input from the power source, or the battery may be charged via the wired cable connected to the connector.

The keypad may receive key input from the user in order to control the electronic device 100. The keypad may include a physical keypad formed on the electronic device 100 or a virtual keypad displayed on the touch screen 160.

The memory 120 may store data for driving one or a plurality of applications, such as a voice recognition application, a scheduling application, a word-processing application, a music application, an Internet application, a map application, a camera application, an email application, an image edition application, a search application, a file search application, a video application, a game application, an SNS application, a telephone application, and a message application. The memory 120 may store data or a database, such as images, user information, and documents, for providing a Graphical User Interface (GUI) associated with one or a plurality of applications, background images (a menu screen, an idle screen, or the like) or operating programs required to drive the electronic device 100, images captured by the camera, or the like. The memory 120 is a medium that can be read by a machine (e.g., a computer), and the term "machine-readable medium" may be defined as a medium that provides data to a machine so that the machine can perform a particular function. The machine-readable medium may be a storage medium. The memory 120 may include at least one of a nonvolatile memory 121 and a volatile memory 122. The volatile memory 121 is a memory for temporarily storing information required by the host control unit 170 and can maintain information stored therein while powered on. The nonvolatile memory 122 is a memory for permanently or semi-permanently storing the information required by the host control unit 170 and can continue maintaining information even when powered off if there is information previously stored in the memory.

The volatile memory 122 may be, for example, Dynamic RAM (DRAM), Static RAM (SRAM), Synchronous Dynamic RAM (SDRAM), or the like. The nonvolatile memory 121 may be, for example, a One-Time Programmable ROM (OTPROM), Programmable ROM (PROM), Erasable and Programmable ROM (EPROM), Electrically Erasable and Programmable ROM (EEPROM), mask ROM, flash ROM, or the like. The nonvolatile memory may further include a removable memory, such as a floppy disk, a flexible disk, a hard disk, a magnetic tape, a Compact Disk Read-Only Memory (CD-ROM), or the like. The nonvolatile memory 121 may store commands and data necessary for the operation of the electronic device 100, and may also store commands and data necessary for the operation of the touch-sensing module 160.

For example, the nonvolatile memory 121 may store gesture information on predefined gesture types based on signal values to be output to the touch-sensing module 160. The gesture information may be included in the gesture database. The gesture information can be retrieved, managed, and updated through the gesture database.

In the present invention, the gesture types based on the signal values may refer to gesture types that can be determined using signal values (e.g., a capacitance value, a voltage value, or a current value) output from a touch panel 210 of the touch-sensing module 160. Alternatively, the gesture types based on the signal values may refer to gesture types that can be determined using user-input information (e.g., a touch-off position, the number of touches, the coordinates of a touch, touch strength, touch time, touch movement speed, the trajectory of a touch, a touch movement direction, the area of a touch, the angle of a touch, or the like) derived from the signal values.

The gesture information may be pieces of information necessary for determining the foregoing gesture types using the foregoing signal values or user-input information. In detail, the gesture information may include a touch recognition algorithm for determining a gesture type by applying a signal value or user input as an input value. Technology related to touch recognition algorithms is well known, and thus a detailed description thereof will be omitted herein.

Alternatively, the gesture information may include additional information necessary for performing the touch recognition algorithm. The additional information necessary for the touch recognition algorithm may be, for example, data recording a signal value pattern or user input pattern classified by gesture, which is learned based on a plurality of users. Further, the additional information may be data recording a signal value pattern or user input pattern corresponding to a gesture predefined by the user of the electronic device 100 to implement a particular function.

FIG. 3 illustrates gesture types based on user input.

In FIG. 3, gesture types may include gestures 301 predefined by a manufacturer of the electronic device 100, a provider of an application installed in the electronic device 100 or a provider of an operating system, and may include gestures 302 additionally designated by the user.

The predefined gestures 301 may include, for example, at least one of a touch gesture, a drag gesture, a pinch gesture, a swipe gesture, a long touch gesture, a multi-touch gesture, and a knock-on gesture.

As an example of the predefined gestures 301, when the user touches one spot on the touch-sensing module 160 with one finger as indicated by 301-1 of FIG. 3, a gesture type corresponding to this user input may be determined to be a touch gesture through the touch recognition algorithm. In this case, the host control unit 170 may implement a particular function using information on the user input determined to be the touch gesture. For example, the host control unit 170 may keep a file corresponding to the touched position selected on the screen. Alternatively, the host control unit 170 may display an execution screen of the file corresponding to the touched position on the screen.

As an example of the predefined gestures 301, when the user touches one spot on the touch-sensing module 160 a plurality of times, as indicated by 301-2 of FIG. 3, screen switching may be performed. For example, when the user touches the touch-sensing module 160 twice with the screen turned off, the host control unit 170 may switch the screen on. Conversely, when the user touches the touch-sensing module 160 twice with the screen turned on, the host control unit 170 may switch the screen off.

In another example, as indicated by 302 of FIG. 3, the user may further define a gesture to perform a particular shortcut function. For example, when the user draws a gesture in a rotated 'L' shape on the touch-sensing module, as indicated by 302-1 in FIG. 3, a gesture type corresponding to this user input may be determined to be a first user-defined gesture defined by the user through the touch recognition algorithm. In this case, the host control unit 170 may implement a particular function using information on the user input determined to be the touch gesture. For example, the host control unit 170 may display a home screen through the touch-sensing module 160.

In still another example, as indicated by 302-2 of FIG. 3, the user may further define a second user-defined gesture, such as a knock-code user-defined gesture. For example, when the user touches each area of the screen in a certain pattern, the host control unit 170 switches the screen from the off state to the on state, thus unlocking the screen.

The sensor unit 130 may include one or a plurality of sensors that detect the state (position, orientation, motion, or the like) of the electronic device 100. For example, the sensor unit 130 may be a proximity sensor that detects whether the user approaches the electronic device 100 or a motion/orientation sensor that detects the movement of the electronic device 100 (e.g., the rotation, acceleration, deceleration, or vibration of the electronic device 100). In addition, the motion/orientation sensor may include an acceleration sensor (or gravity sensor) that measures inclination and detects a linear speed change, a gyro sensor that detects angular speed, an impact sensor, a GPS sensor, a compass sensor (or geomagnetic sensor) that detects orientation, or an inertial sensor that detects the inertial force of a motion and provides various pieces of information, such as the acceleration, speed, direction, and distance of a moving object to be measured. The sensor unit 130 may detect the state of the electronic device 100, may generate a signal corresponding to the detection, and may transmit the signal to the host control unit 170. For example, the GPS sensor may receive radio waves from a plurality of GPS satellites (not shown) orbiting the Earth and may calculate the GPS position of the electronic device 100 using the time of arrival from the GPS satellites (not shown) to the electronic device 100. The compass sensor may calculate the position or orientation of the electronic device 100.

The camera 140 may include: a lens system that forms an optical image of a subject by concentrating light incident from the outside; an image sensor that converts an optical image into an electrical image signal or data and outputs the signal or data; and a drive unit that drives the image sensor under the control of the host control unit 170, and may further include a flash or the like.

The communication unit 150 is provided for direct connection to a server or to an external electronic device or for connection thereto through a network, and may be a wired or wireless communication unit. The communication unit 150 may transmit data from the host control unit 170, the memory 120, the camera 140, or the like in a wired or wireless manner, or may receive data via an external communication line or the air in a wired or wireless manner and may transmit the data to the host control unit 170 or may store the data in the memory 120.

The communication unit 150 may include a mobile communication module, a wireless LAN module, or a short-range communication module. The communication unit 150 may include, but is not limited to, an Integrated Services Digital Network (ISDN) card, a modem, a Local Area Network (LAN) card, an infrared port, a Bluetooth port, a ZigBee port, or a wireless port.

The mobile communication module allows the electronic device 100 to be connected to an external device through mobile communication using one or a plurality of antennas under the control of the host control unit 170. The mobile communication module transmits/receives a radio frequency (RF) signal used for the exchange, one-way transmission, or one-way reception of data, such as a voice call, a video call, SMS, and Multimedia Message Service (MIMS), with a mobile phone, a smart phone, a tablet PC or other devices having a telephone number or a network address input to the electronic device 100.

The wireless LAN module may be connected to the Internet in a place where a wireless Access Point (AP, not shown) is installed under the control of the host control unit 170. The wireless LAN module supports wireless LAN standards (IEEE 802.11x) of the Institute of Electrical and Electronics Engineers (IEEE). The short-range communication module may wirelessly perform short-range communication between the electronic device 100 and an image-forming apparatus (not shown) under the control of the host control unit 170. A short-range communication mode may include Bluetooth or Infrared Data Association (IrDA).

The touch-sensing module 160 displays an image or data input from the host control unit 170 on the screen. The touch-sensing module 160 may display an image under the control of the host control unit 170, and may output user-input information including at least input coordinates or at least an input state to the host control unit 170 when a user input tool, such as a finger or a stylus pen, touches or approaches the surface of the touch-sensing module 160 (for example, when the distance between the touch-sensing module 160 and the user's body part or the input tool is greater than 0 cm and is less than or equal to 5 cm). That is, the touch-sensing module 160 detects user input and outputs information on the detected user input to the host control unit 170.

The host control unit 170 may include a Central Processing Unit (CPU) or an Application Processor (AP). In the present invention, the host control unit 170 is understood to have the same meaning as a controller of the electronic device 100. The host control unit 170 may load an instruction or data received from at least one of the nonvolatile memory 121 or other components into the volatile memory 122 and may process the same. Alternatively, the host control unit 170 may store data received or generated from other components in the nonvolatile memory 121. Further, the host control unit 170 may execute an application operation based on user-input information. Here, the user input may include input through the input/output module 110, the touch-sensing module 160 or the sensor unit 130, or input based on the camera 140.

In addition, the host control unit 170 may control the touch-sensing module 160. When the touch-sensing module 160 is reset with gesture information stored in the nonvolatile memory 121, the host control unit 180 may control the touch-sensing module 160 so that the gesture information from the nonvolatile memory 121 of the electronic device 100 is stored in a memory 250 of the touch-sensing module 160.

Figure 2:
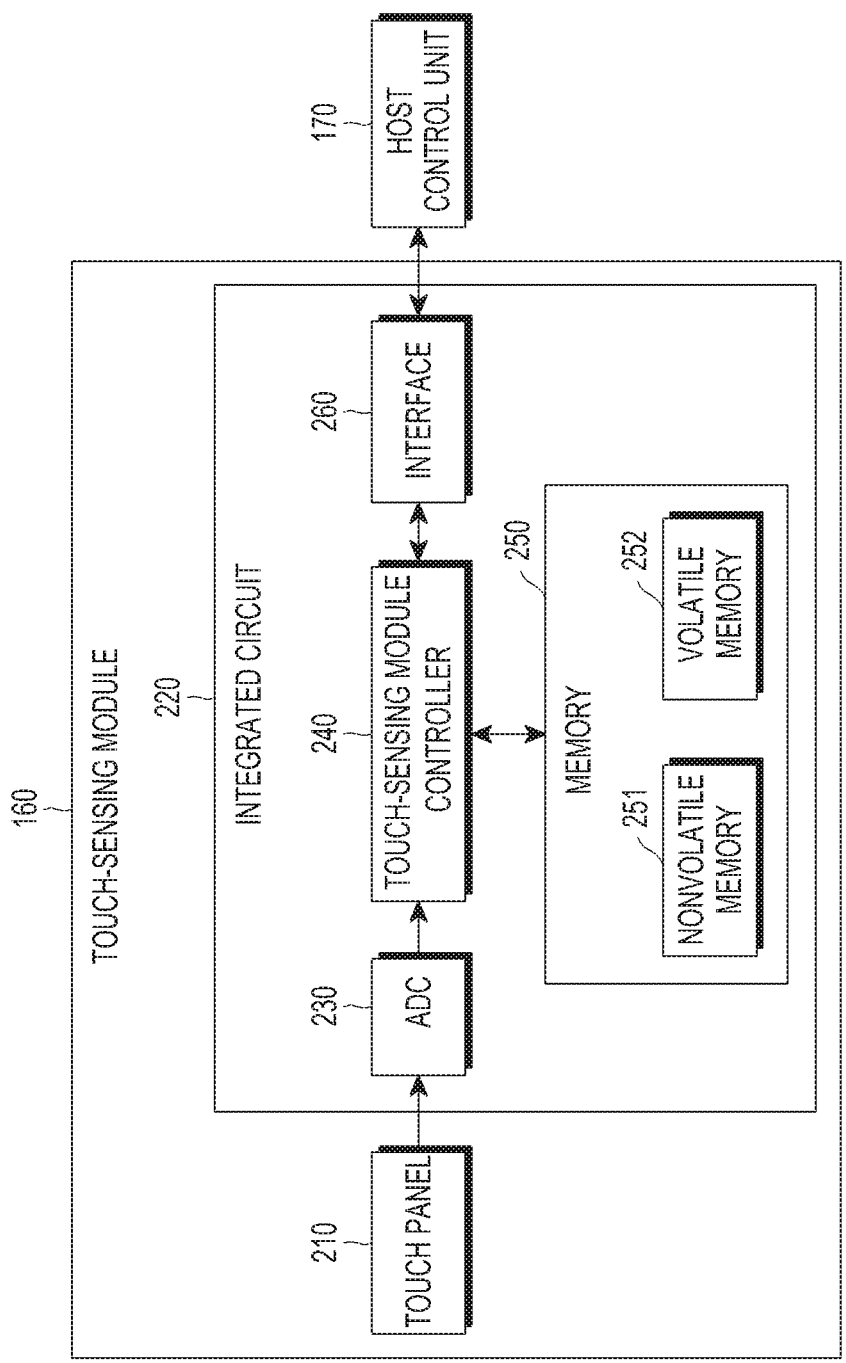
FIG. 2 illustrates the main configuration of a touch-sensing module according to one embodiment of the present invention.

FIG. 2 illustrates the main configuration of a touch-sensing module according to one embodiment of the present invention.

The touch-sensing module 160 includes a touch panel 210 and an integrated circuit 220.

The touch panel 210 includes cells in a matrix structure and outputs the signal values of the cells to the integrated circuit 220. These cells are based on functional division, and may be, for example, electrodes disposed in a matrix structure or the intersections of electrode lines disposed in a lattice form. The signal values of the cells may be capacitance values, voltage values, current values, or the like.

When the touch panel 210 is a capacitive touch panel, the signal values of the touch panel 210 may be classified into self-capacitance values and mutual-capacitance values, and the touch panel 210 may output the self-capacitance values and/or the mutual capacitance values to the integrated circuit. Each of the self-capacitance values and the mutual capacitance values may be a capacitance value, a voltage value or a current value corresponding to a capacitance value, or the like.

Although the following description illustrates the case where the touch panel 210 is a capacitive touch panel, the data processing method of a touch-sensing module according to various embodiments of the present invention may be applied to touch panels of various operation modes. For example, operation modes for the touch panel 210 may include a resistive mode, an infrared (IR) mode, a Surface Acoustic Wave (SAW) mode, an Electromagnetic (EM) mode, and an Electromagnetic Resonance (EMR) mode, in addition to a capacitive mode.

The integrated circuit 220 receives the signal values of the cells from the touch panel 210, calculates user-input information, such as the position of a touch, the coordinates of a touch, the number of touches, touch strength, a cell ID, the angle of a touch, or the area of a touch, from the signal values, and outputs the calculated user-input information to the host control unit 170. The integrated circuit 220 may output, to the host control unit 170, device information, such as the ID of the touch panel 210 or the touch-sensing module 160, the row length (or horizontal length) of the touch panel 210, and the column length (vertical length) thereof, in addition to the user-input information. Further, the integrated circuit 220 may receive the device information from the touch panel 210.

The integrated circuit 220 includes an Analog-to-Digital Converter (ADC) 230, a touch-sensing module controller 240, a memory 250, and an interface 260.

The ADC 230 converts analog signal values input from the touch panel 210 into digital signal values. These digital signal values may be referred to as raw data.

The memory 250 may include at least one of a nonvolatile memory 251 and a volatile memory 252. The volatile memory 251 is a memory for temporarily storing information required by the touch-sensing module controller 240, and can maintain information stored therein while the touch-sensing module 160 is powered on.

The nonvolatile memory 252 is memory for permanently or semi-permanently storing the information required by the touch-sensing module controller 240, and can continue maintaining information even though powered off if there is information previously stored in the memory.

The volatile memory 252 may be, for example, Dynamic RAM (DRAM), Static RAM (SRAM), Synchronous Dynamic RAM (SDRAM), or the like. The nonvolatile memory 251 may be, for example, a One-Time Programmable ROM (OTPROM), Programmable ROM (PROM), Erasable and Programmable ROM (EPROM), Electrically Erasable and Programmable ROM (EEPROM), mask ROM, flash ROM, or the like.

The touch-sensing module controller 240 determines user-input information from the digital signal values input from the ADC 230. Further, the touch-sensing module controller 240 may determine the type of gesture input by the user from the user-input information. To determine the user-input information or the type of gesture, the touch-sensing module controller 240 may use gesture information.

For example, the touch-sensing module controller 240 may read the gesture information stored in the nonvolatile memories 251 and 121 and may store the gesture information in the volatile memory 252 of the touch-sensing module 160. Subsequently, the touch-sensing module controller 240 may calculate user-input information from the digital signal values using the gesture information stored in the volatile memory 252. Here, the nonvolatile memories 251 and 121 storing the gesture information may be the nonvolatile memory 251 of the touch-sensing module 160 or the nonvolatile memory 121 of the electronic device 100.

When the gesture information is stored in the nonvolatile memory 121 of the electronic device 100, the touch-sensing module controller 240 may read the gesture information stored in the nonvolatile memory 121 of the electronic device 100 and may store the gesture information in the nonvolatile memory 251 of the touch-sensing module 160. Also, the touch-sensing module controller 240 may read the gesture information stored in the nonvolatile memory 251 of the touch-sensing module 160 and may store the gesture information in the volatile memory 252 of the touch-sensing module 160. Subsequently, the touch-sensing module controller 240 may calculate user-input information from the digital signal values using the gesture information stored in the volatile memory 252.

When the user-input information or the type of gesture is determined using the gesture information, the touch-sensing module controller 240 may output the user-input information or information on the type of gesture to the interface 260. The touch-sensing module controller 240 compresses the digital signal values using a preset compression mode and outputs the compressed signal values to the interface 260.

The interface 260 outputs the user-input information or the information on the type of gesture to the host control unit 170 using a preset interface mode. The preset interface mode may be at least one of I2C, SPI, and USB modes. The interface 260 may be used as a medium intervening in communication between the touch-sensing module controller 240 and the host control unit 170. Although not shown, the host control unit 170 may also include a second interface operating in the same interface mode as the interface 260. The interface 260 may also be disposed in the host control unit 170 or between the touch-sensing module 160 or the integrated circuit 220 and the host control unit 170, instead of being disposed in the integrated circuit 220.

The host control unit 170 may execute an application operation based on the user-input information or the information on the type of gesture received from the interface 260. For example, when a telephone application is running, the host control unit 170 may detect that a call button of the telephone application is selected based on the user-input information or the type of gesture, and may transmit a call to a counterpart through the communication unit.

Figure 4:
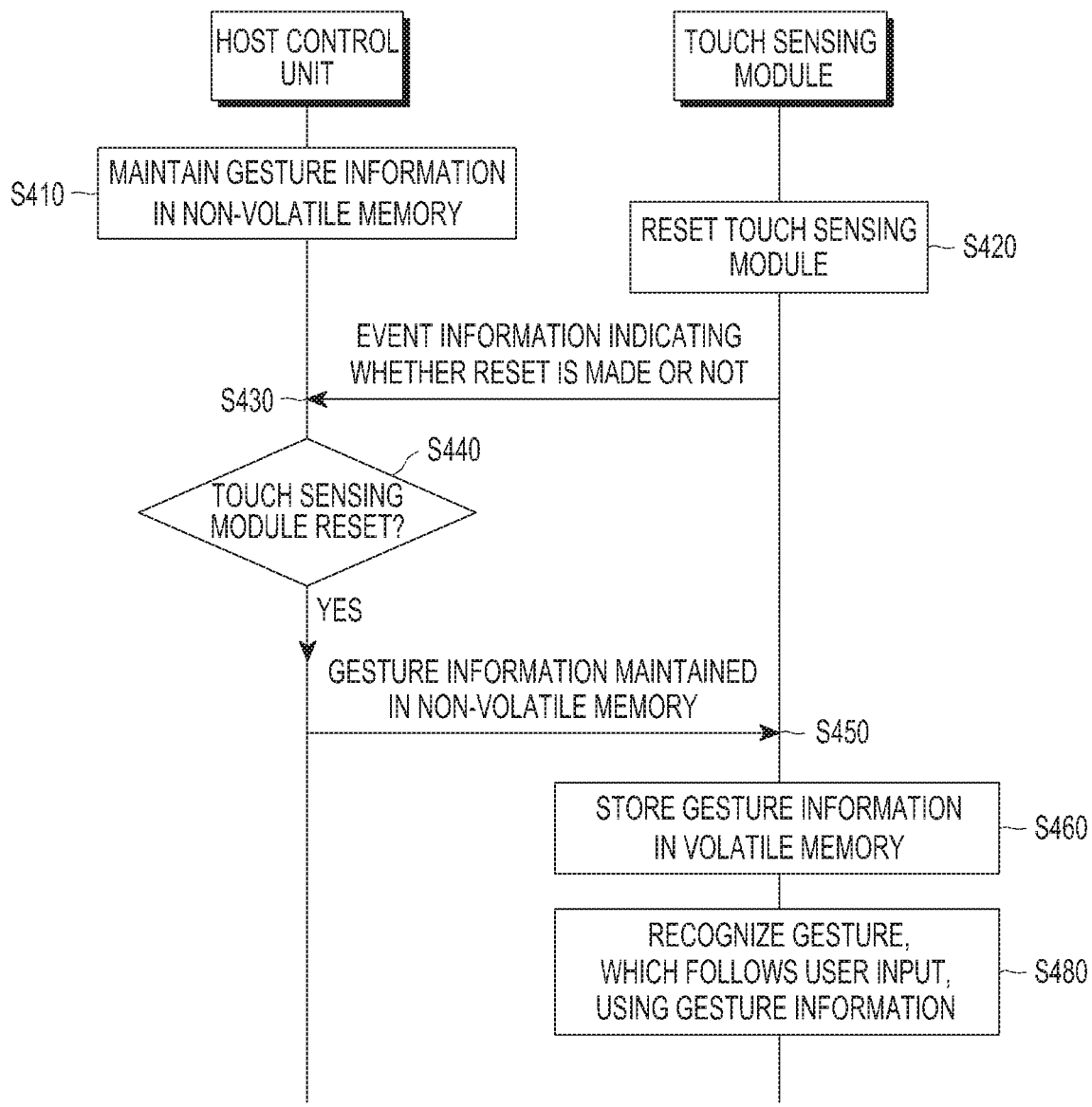
FIG. 4 is a flowchart illustrating a method for recognizing a user gesture using gesture information between a host control unit and a touch-sensing module according to one embodiment of the present invention.

FIG. 4 is a flowchart illustrating a method for recognizing a user gesture using gesture information between the host control unit 100 and the touch-sensing module 160 according to one embodiment of the present invention.

In operation S410, gesture information, in which gesture types based on signal values to be output from the touch-sensing module 160 are defined, may be maintained in the nonvolatile memory 121 of the electronic device 100. Maintaining the gesture information in the nonvolatile memory 121 may mean that the gesture information is stored in the nonvolatile memory 121.

In operation S420, the touch-sensing module 160 may be reset. The touch-sensing module 160 may be reset, for example, when the electronic device 100 is booted up. Further, the touch-sensing module 160 may be reset, for example, when the screen of the touch-sensing module 160 switches from the off state to the on state. The switching of the screen from the off state to the on state may include, for example, switching from an entirely black screen of the electronic device 100 to a screen displaying information (for example, a home screen or lock screen) in the case where the user presses a button on a lateral side or the front side of the electronic device 100. In addition, the touch-sensing module 160 may be reset, for example, when a watchdog of the electronic device 100 senses a malfunction of the touch-sensing module 160 and thus forcibly resets the touch-sensing module 160.

When the touch-sensing module 160 is reset, the touch-sensing module 160 may transmit event information indicating whether the touch-sensing module 160 has been reset to the host control unit 170 in operation S430. Here, the event information indicating whether the touch-sensing module 160 has been reset may include information indicating whether the volatile memory 252 of the touch-sensing module 160 has been initialized. In detail, when the touch-sensing module 160 has been reset, the event information may include information with an RAM initialization flag set.

When the event information indicating whether the touch-sensing module 160 has been reset is received, the host control unit 170 may identify the details of the event information and may determine whether the touch-sensing module 160 has been reset in operation S440. In detail, the host control unit 170 may read the RAM initialization flag included in the event information using an interrupt handler for processing an external interrupt. When it is determined that the RAM initialization flag is set, the host control unit 170 may determine that the touch-sensing module 160 has been reset.

When it is determined that the touch-sensing module 160 has been reset, the host control unit 170 may transmit the gesture information maintained in the nonvolatile memory 120 to the touch-sensing module 160 in operation S450.

When the gesture information is received, the touch-sensing module 160 may store the gesture information in the volatile memory 251 of the touch-sensing module 160 in operation S460.

When signal values are output from the touch panel 210 based on user input on the touch-sensing module 160, the touch-sensing module 160 may perform gesture recognition using the gesture information stored in the nonvolatile memory 251 or the nonvolatile memory 252 in operation S480. Performing the gesture recognition may include, for example, determining the type of gesture based on user input, the position of a gesture, or the direction of a gesture. Here, the user input may be hovering input, input with a pen, gripping/holding input, or bezel input, and various input methods generally known in the art may be used to perform the gesture recognition.

Figure 5:
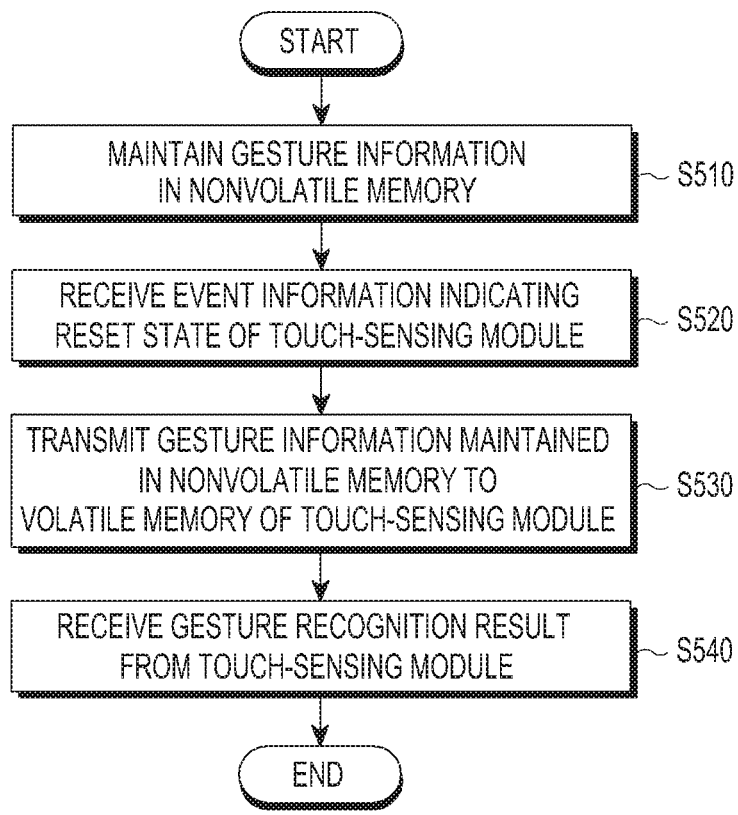
FIG. 5 is a flowchart illustrating a method for an electronic device to control a touch-sensing module according to one embodiment of the present invention.

FIG. 5 is a flowchart illustrating a method for the electronic device 100 to control the touch-sensing module according to one embodiment of the present invention.

In operation S510, the electronic device 100 may maintain gesture information, in which gesture types based on signal values to be output from the touch-sensing module 160 are defined, in the nonvolatile memory 121.

With the gesture information maintained in the nonvolatile memory 121, the electronic device 100 may receive event information indicating a reset state of the touch-sensing module 160 from the touch-sensing module 160 in operation S520. The event information may include, for example, information indicating an initialized state of the volatile memory 252 of the touch-sensing module 160.

In operation S530, the electronic device 100 may transmit the gesture information maintained in the nonvolatile memory 121 to the volatile memory 252 of the touch-sensing module 160 in response to the event information indicating the reset state.

Next, when the touch-sensing module 160 performs gesture recognition based on user input using the received gesture information, the electronic device 100 may receive a gesture recognition result from the touch-sensing module 160 in operation S540. The gesture recognition result may include, for example, information on the type of gesture based on the user input, information on the position of the gesture, or information on the direction of the gesture. Alternatively, the gesture recognition result may include user-input information (e.g., the position of a touch, the coordinates of a touch, the number of touches, touch strength, a cell ID, the angle of a touch, or the area of a touch).

Figure 6:
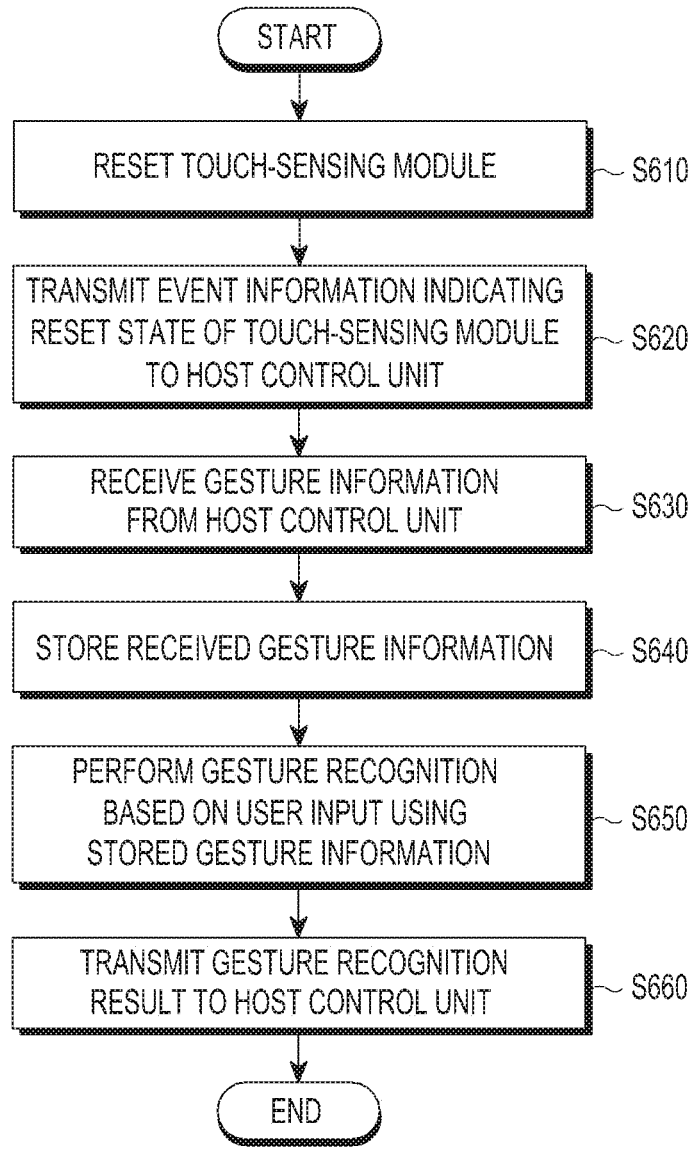
FIG. 6 is a flowchart illustrating a method for operating a touch-sensing module according to one embodiment of the present invention.

FIG. 6 is a flowchart illustrating a method for operating the touch-sensing module 160 according to one embodiment of the present invention.

In operation S610, the touch-sensing module 160 may be reset. When the touch-sensing module 160 is reset, the touch-sensing module 160 may transmit event information indicating the reset state of the touch-sensing module 160 to the host control unit 170 in operation S620. As a result of transmitting the event information, the touch-sensing module 160 may receive gesture information from the host control unit 170 in operation S630. In detail, the touch-sensing module 160 may receive the gesture information, obtained by the host control unit 170 from the nonvolatile memory 121, through the interface 260.

When the gesture information is received, the touch-sensing module 160 may store the received gesture information in the volatile memory 252 of the touch-sensing module 160 in operation S640.

When a user gesture is input onto the touch-sensing module 160 with the gesture information stored, the touch-sensing module 160 may perform gesture recognition based on the user input using the stored gesture information in operation S650. Performing the gesture recognition may include, for example, determining the type of gesture based on the user input, the position of the gesture, or the direction of the gesture.

Next, the touch-sensing module 160 may transmit a gesture recognition result to the host control unit 170 in operation S660.

It will be understood that the embodiments of the present invention can be realized in the form of hardware, software, or a combination of hardware and software. For example, each component, such as the memory, the communication unit, the interface, the host control unit, the touch-sensing module controller and the like, in the configurations illustrated in FIGS. 1 and 2 may be configured as a device. Software may be stored, for example, regardless of deletability or re-recordability, in: a volatile or nonvolatile storage device, such as a storage device including ROM; a memory, for example, RAM, a memory chip, a device, or an integrated circuit; or an optically or magnetically recordable and machine (for example, computer)-readable storage medium, for example, a CD, a DVD, a magnetic disc, or a magnetic tape. It will be understood that the memory that can be included in the electronic device or the touch screen is an example of a machine-readable storage medium that is suitable for storing a program or programs including instructions to implement the embodiments of the present invention. Therefore, the present invention includes a program that includes code to implement an apparatus or method described in an arbitrary claim of the present specification and a machine-readable storage medium that stores the program. Further, the program may be electronically transferred through an arbitrary medium, such as a communication signal transmitted via a wired or wireless connection, and the present invention includes equivalents thereof as appropriate.

Further, the electronic device or the touch-sensing module may receive and store the program from a program provision device connected in a wired or wireless manner. The program provision device may include a program including instructions for the electronic device or the touch-sensing module to perform a data processing method of the touch-sensing module, a memory to store information necessary for the data processing method of the touch-sensing module, a communication unit to perform wired or wireless communication with the electronic device, and a host control unit to transmit the program to the electronic device upon a request from the electronic device or automatically.

While the present invention has been described with reference to specific embodiments, various changes and modifications may be made without departing from the spirit and scope of the present invention. Accordingly, the scope of the present invention will be defined not by the described embodiments but by the appended claims and equivalents thereto.

Hereinafter, various embodiments of the present invention will be described with reference to the accompanying drawings. However, it should be understood that there is no intent to limit the present invention to the particular forms disclosed herein; rather, the present invention should be understood to cover various modifications, equivalents, and/or alternatives of embodiments of the present invention. In describing the drawings, similar reference numerals may be used to designate similar constituent elements.

As used herein, the expressions "have", "may have", "include", or "may include" refer to the existence of a corresponding feature (e.g., numeral, function, operation, or constituent element such as component), and do not exclude one or more additional features.

In the present invention, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present invention may modify various components regardless of the order and/or the importance thereof, and may be used only to distinguish one component from another component, without limiting the corresponding components. For example, a first user device and a second user device indicate different user devices regardless of the order and/or the importance thereof. For example, a first element may be termed a second element, and similarly, a second element may be termed a first element without departing from the scope of the present invention.

It should be understood that when an element (e.g., first element) is referred to as being (operatively or communicatively) "connected" or "coupled" to another element (e.g., second element), it may be directly connected or directly coupled to the other element, or some other element (e.g., a third element) may be interposed between them. In contrast, it may be understood that when an element (e.g., first element) is referred to as being "directly connected," or "directly coupled" to another element (second element), there is no element (e.g., third element) interposed between them.

The expression "configured (set) to" used in the present invention may be exchanged with, for example, "suitable for", "having the capacity to", "designed to", "adapted to", "made to", or "capable of" according to the situation. The term "configured (set) to" may not necessarily imply "specifically designed to" in hardware. Alternatively, in some situations, the expression "device configured to" may mean that the device, together with other devices or components, "is able to". For example, the phrase "processor configured (or set) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

The terms used herein are merely for the purpose of describing particular embodiments, and are not intended to limit the scope of other embodiments. As used herein, singular forms may include plural forms as well, unless the context clearly indicates otherwise. Unless defined otherwise, all terms used herein, including technical and scientific terms, have the same meaning as those commonly understood by a person skilled in the art to which the present invention pertains. Such terms as those defined in a generally used dictionary may be interpreted to have meanings equal to the contextual meanings in the relevant field of art, and are not to be interpreted as having ideal or excessively formal meanings unless clearly defined in the present invention. In some cases, even the terms defined in the present invention should not be interpreted to exclude embodiments of the present invention.

An electronic device according to various embodiments of the present invention may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a pair of glasses, a contact lens, or a Head-Mounted Device (HMD)), a fabric- or clothing-integrated type (e.g., a piece of electronic clothing), a body-mounted type (e.g., a skin pad or tattoo), and a bio-implantable type (e.g., an implantable circuit).

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA) device, a Magnetic Resonance Imaging (MRI) device, a Computed Tomography (CT) machine, an imaging device, and an ultrasonic machine), a navigation device, a Global Navigation Satellite System (GNSS), an Event Data Recorder (EDR), a Flight Data Recorder (FDR), an in-vehicle infotainment device, an electronic device for a ship (e.g., a navigation device for a ship or a gyro-compass), avionics devices, security devices, an automotive head unit, a robot for industry or home, an Automated Teller Machine (ATM) in a bank, a Point-Of-Sale (POS) terminal in a shop, or an Internet of Things device (e.g., a light bulb, various sensors, an electric or gas meter, a sprinkler device, a fire alarm, a thermostat, a streetlamp, a toaster, sporting goods, a hot water tank, a heater, a boiler, etc.).

According to some embodiments, the electronic device may include at least one of a part of furniture or a building/structure, an electronic board, an electronic signature-receiving device, a projector, and various kinds of measurement instruments (e.g., a water meter, an electric meter, a gas meter, and a radio wave meter). In various embodiments, the electronic device may be a combination of one or more of the aforementioned various devices. According to some embodiments, the electronic device may also be a flexible device. Further, the electronic device according to an embodiment of the present invention is not limited to the aforementioned devices, and may include a new electronic device according to the development of technology.

Hereinafter, an electronic device according to various embodiments will be described with reference to the accompanying drawings. In the present invention, the term "user"

may indicate a person using an electronic device or a device (e.g., an artificial intelligence electronic device) using an electronic device.

Figure 7:
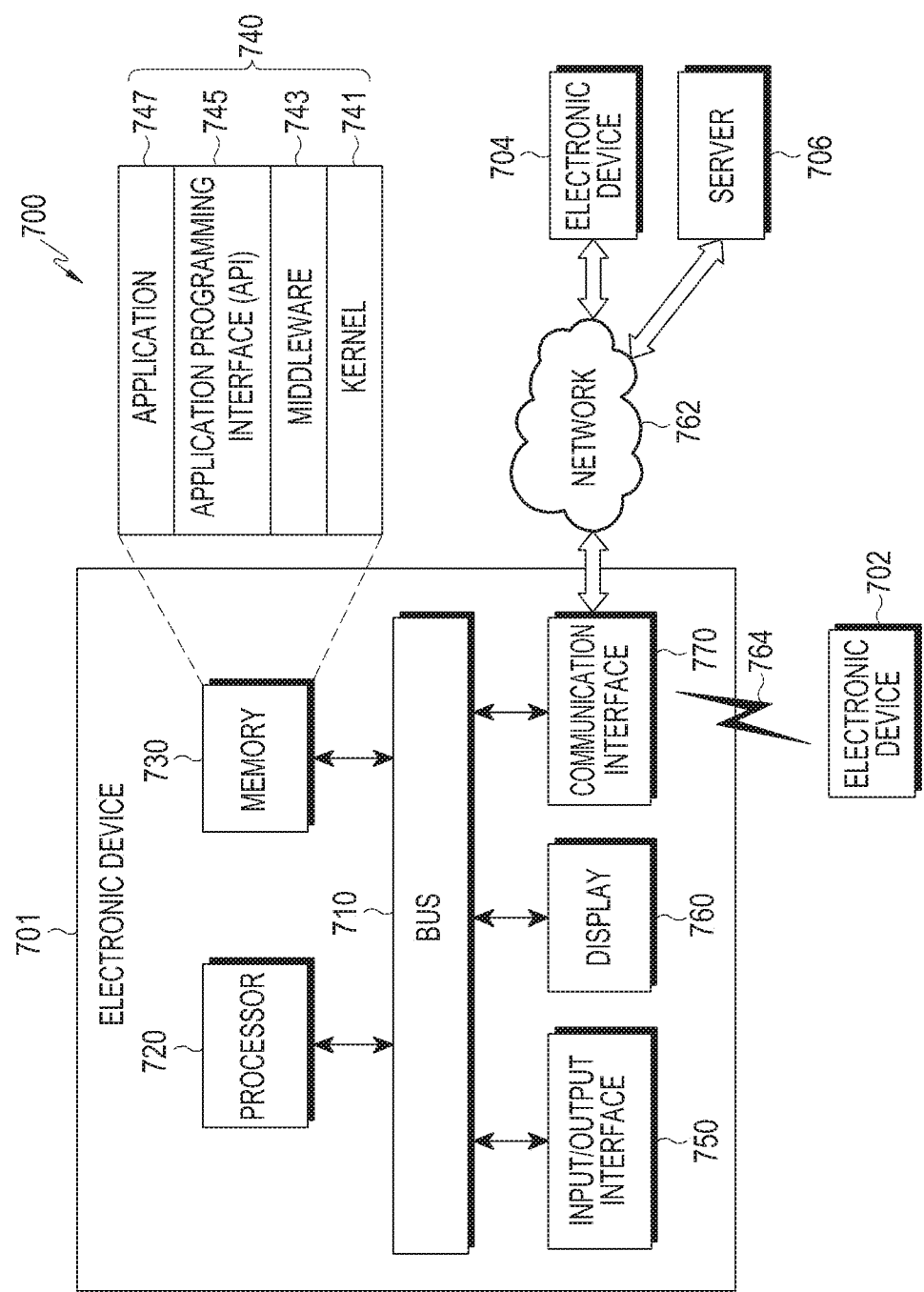
FIG. 7 illustrates a network environment according to various embodiments.

FIG. 7 illustrates an electronic device 701 in a network environment 700 according to various embodiments. The electronic device 701 may include a bus 710, a processor 720, a memory 730, an input/output interface 750, a display 760, and a communication interface 770. In some embodiments, at least one of the components may be omitted, or an additional component may be further included in the electronic device 701. Further, the electronic device 701 may include all or part of the electronic device 100 illustrated in FIG. 1.

The bus 710 may include, for example, a circuit that connects the components 710 to 770 to each other and delivers communications (e.g., control messages and/or data) between the components.

The processor 720 may include one or more of a Central Processing Unit (CPU), an Application Processor (AP), and a Communication Processor (CP). The processor 720 may control, for example, at least one different component of the electronic device 701, and/or may perform an operation relating to communication or data processing. The processor 720 may include a configuration that is the same as or similar to that of the host control unit 170 of FIG. 1.

The memory 730 may include volatile and/or nonvolatile memory. The memory 730 may store, for example, a command or data related to at least one different component of the electronic device 701. According to one embodiment, the memory 730 may store software and/or a program 740. The program 740 may include, for example, a kernel 741, middleware 743, an Application Programming Interface (API) 745, and/or an application (or "app**") 747. At least part of the kernel 741, the middleware 743, and the API 745 may be designated as an Operating System (OS). The memory 730 may include a configuration that is the same as or similar to that of the memory 120 of FIG. 1.

The kernel 741 may control or manage system resources (e.g., the bus 710, the processor 720, the memory 730, or the like) used to perform an operation or function implemented in other programs (e.g., the middleware 743, the API 745, or the application 747). Further, the kernel 741 may provide an interface that allows the middleware 743, the API 745, or the application 747 to access individual components of the electronic device 701 to thereby control or manage system resources.

The middleware 743 may serve as a relay so that, for example, the API 745 or the application 747 communicates with the kernel 741 to exchange data.

Further, the middleware 743 may process one or more requests for operations received from the application 747 according to the priority thereof. For example, the middleware 743 may assign at least one application 747 a priority for using a system resource (e.g., the bus 710, the processor 720, the memory 730, or the like) of the electronic device 701. For example, the middleware 743 may process the one or more requests for operations according to the priority assigned to the at least one application, thereby performing scheduling or load balancing for the one or more requests for operations.

The API 745 is, for example, an interface for the application 747 to control a function provided from the kernel 741 or the middleware 9743, and may include, for example, at least one interface or function (e.g., a command) for file control, window control, image processing, or text control.

The input/output interface 750 may serve as an interface that delivers a command or data, which is input from, for example, a user or a different external device, to a different component(s) of the electronic device 701. Further, the input/output interface 750 may output a command or data, which is received from a different component(s) of the electronic device 701, to the user or the different external device. The input/output interface 750 may include a configuration that is the same as or similar to that of the input/output module 110 of FIG. 1.

The display 760 may include, for example, a Liquid Crystal Display (LCD), a Light-Emitting Diode (LED) display, an Organic Light-Emitting Diode (OLED) display, a Micro-Electro-Mechanical Systems (MEMS) display, or an electronic paper display. The display 760 may display, for example, various types of content (e.g., text, an image, a video, an icon, a symbol, or the like) for the user. The display 760 may include a touch screen and may receive touch, gesture, proximity, or hovering input using, for example, an electronic pen or a body part of a user. The display 760 may include a configuration that is the same as or similar to that of the touch-sensing module 160 of FIG. 1.

The communication interface 770 may establish communication, for example, between the electronic device 701 and an external device (e.g., a first external electronic device 702, a second external electronic device 704, or a server 706). For example, the communication interface 770 may be connected to a network 762 via wireless communication or wired communication to communicate with the external device (e.g., the second external electronic device 704 or the server 706). The communication interface 770 may include a configuration that is the same as or similar to that of the communication unit 150 of FIG. 1.

The wireless communication may use, for example, a cellular communication protocol, which may be, for example, at least one of Long-Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), and Global System for Mobile Communications (GSM). Further, the wireless communication may include, for example, short-range communication 764. The short-range communication 764 may include, for example, at least one of Wireless Fidelity (Wi-Fi), Bluetooth, Near Field Communication (NFC), and Global Navigation Satellite System (GNSS). The GNSS may include, for example, at least one of a Global Positioning System (GPS), a Global Navigation Satellite System (GLONASS), a BeiDou Navigation Satellite System (hereinafter, "BeiDou"), and Galileo, which is the European global satellite-based navigation system, depending on a use area or bandwidth. In the present document, "GPS" may be interchangeably used with "GNSS" hereinafter. The wired communication may include, for example, at least one of Universal Serial Bus (USB), High Definition Multimedia Interface (HDMI), Recommended Standard 832 (RS-832), and Plain Old Telephone Service (POTS). The network 762 may include a telecommunications network, which may be, for example, at least one of a computer network (e.g., a Local Area Network (LAN) or Wide Area Network (WAN)), the Internet, and a telephone network.

Each of the first and second external electronic devices 702 and 704 may be a device of a type that is the same as or different from that of the electronic device 701. According to one embodiment, the server 706 may include a group of one or more servers. According to various embodiments, all or some of the operations performed in the electronic device 701 may be performed in another electronic device or a plurality of electronic devices (e.g., the electronic devices 702 and 704 or the server 706). According to one embodiment, when the electronic device 701 needs to perform a function or service automatically or upon request, the electronic device 701 may request another electronic device (e.g., the electronic device 702 or 704, or the server 706) to perform at least some functions related to the function or service, instead of, or in addition to, autonomously performing the function or service. The other electronic device (e.g., the electronic device 702 or 704, or the server 706) may perform the requested functions or additional functions and may transmit the result thereof to the electronic device 701. The electronic device 701 may provide the requested function or service using the same received result or by additionally processing the result. To this end, cloud-computing, distributed-computing, or client-server-computing technologies may be used.

Figure 8:
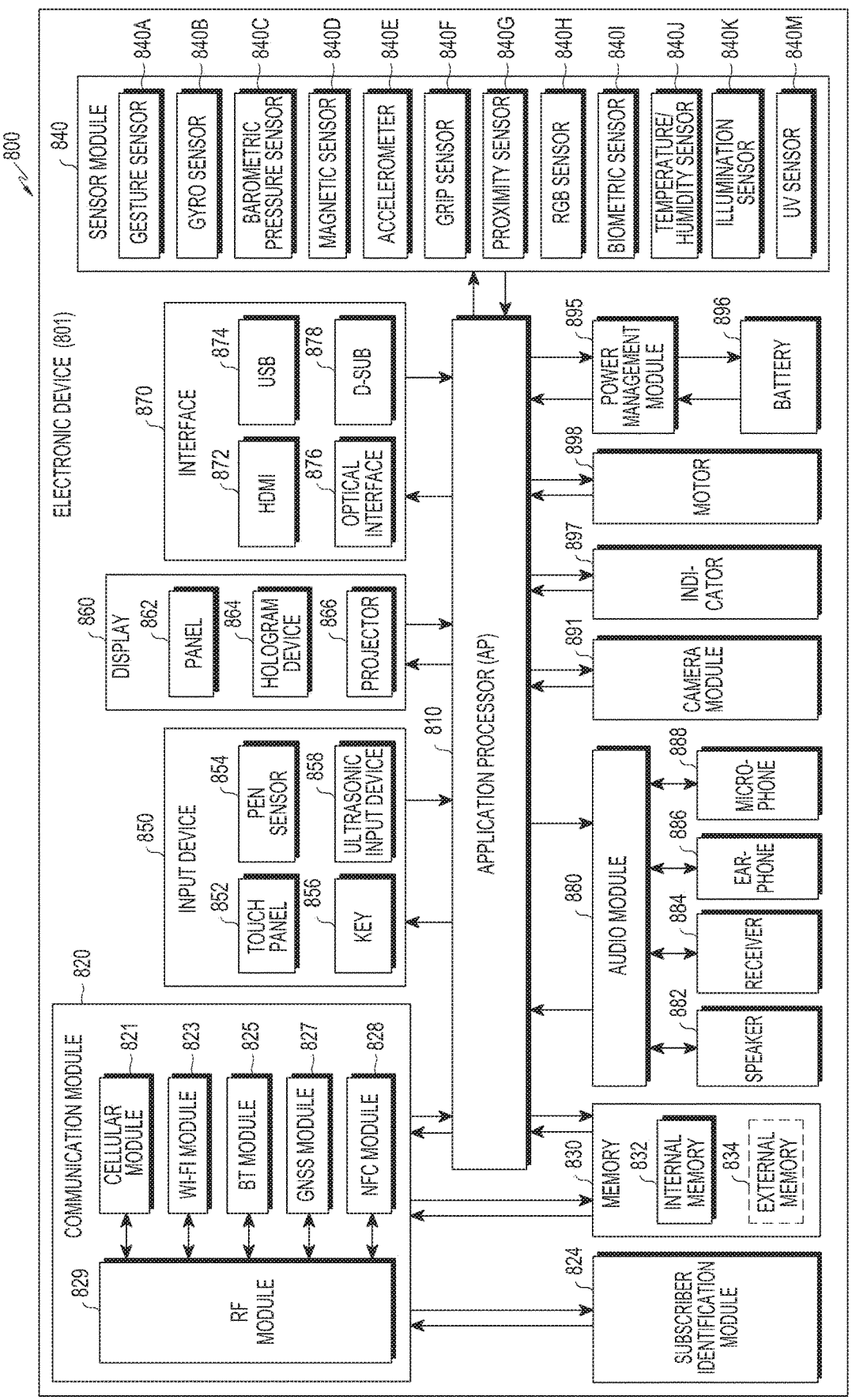
FIG. 8 is a block diagram of an electronic device according to various embodiments.

FIG. 8 is a block diagram of an electronic device 801 according to various embodiments. The electronic device 801 may include, for example, all or part of the electronic device 701 illustrated in FIG. 7. The electronic device 801 may include one or more processors (e.g., Application Processors (APs)) 810, a communication module 820, a subscriber identification module 224, a memory 830, a sensor module 840, an input device 850, a display 860, an interface 870, an audio module 880, a camera module 891, a power management module 895, a battery 896, an indicator 897, and a motor 898.

The processors 810 may run, for example, an operating system or an application to control a plurality of hardware or software components that are connected to the processors 810, and may perform various kinds of data processing and operations. The processors 810 may be configured, for example, as a System on Chip (SoC). According to one embodiment, the processors 810 may further include a Graphic Processing Unit (GPU) and/or an image signal processor. The processors 810 may include at least some (e.g., a cellular module 821) of the components illustrated in FIG. 8. The processors 810 may load a command or data received from at least one of other components (e.g., a nonvolatile memory) into a volatile memory to process the command or data, and may store resultant data in the nonvolatile memory.

The communication module 820 may have a configuration that is the same as or similar to that of the communication interface 770 in FIG. 7. The communication module 820 may include, for example, a cellular module 821, a Wi-Fi module 823, a Bluetooth module 825, a GNSS module 827 (e.g., a GPS module, a GLONASS module, a BeiDou module, or a Galileo module), an NFC module 828, and a Radio Frequency (RF) module 829.

The cellular module 821 may provide, for example, a voice call, a video call, a text messaging service, or an Internet service through a communication network. According to one embodiment, the cellular module 821 may perform identification and authentication of the electronic device 801 in a communication network using the subscriber identification module (e.g., a SIM card) 824. According to one embodiment, the cellular module 821 may perform at least part of the functions provided by the processors 810. According to one embodiment, the cellular module 821 may include a Communication Processor (CP).

The Wi-Fi module 823, the Bluetooth module 825, the GNSS module 827, and the NFC module 828 may each include a processor to process data transmitted and received via the respective modules. According to one embodiment, at least some (e.g., two or more) of the cellular module 821, the Wi-Fi module 823, the Bluetooth module 825, the GNSS module 827, and the NFC module 828 may be included in one Integrated Chip (IC) or IC package.

The RF module 829 may transmit and receive, for example, a communication signal (e.g., an RF signal). The RF module 829 may include, for example, a transceiver, a Power Amplifier (amp) Module (PAM), a frequency filter, a Low-Noise Amplifier (LNA), an antenna, or the like. According to another embodiment, at least one of the cellular module 821, the Wi-Fi module 823, the Bluetooth module 825, the GNSS module 827, and the NFC module 828 may transmit and receive an RF signal through a separate RF module.

The subscriber identification module 824 may include, for example, a card including a subscriber identification module and/or an embedded SIM, and may include unique identification information (e.g., an Integrated Circuit Card Identifier (ICCID)) or subscriber information (e.g., an International Mobile Subscriber Identity (IMSI)).

The memory 830 (e.g., the memory 730) may include, for example, internal memory 832 or external memory 834. The internal memory 832 may include, for example, at least one of a volatile memory (e.g., a Dynamic Random-Access Memory (DRAM), a Static RAM (SRAM), a Synchronous Dynamic RAM (SDRAM), or the like) and a nonvolatile memory (e.g., a One-Time Programmable Read-Only Memory (OTPROM), a Programmable ROM (PROM), an Erasable And Programmable ROM (EPROM), an Electrically Erasable and a Programmable ROM (EEPROM), a mask ROM, a flash ROM, a flash memory (e.g., an NAND flash, an NOR flash, or the like), a hard drive, or a Solid-State Drive (SSD)).

The external memory 834 may further include a flash drive, for example, a Compact Flash (CF), a Secure Digital (SD), a micro Secure Digital (micro-SD), a mini Secure Digital (mini-SD), an extreme digital (xD), a Multi-Media Card (MMC), a memory stick, or the like. The external memory 834 may be functionally and/or physically connected to the electronic device 801 through any of various interfaces.

The sensor module 840 may measure, for example, physical quantities or may detect the state of operation of the electronic device 801 and convert measured or detected information into an electrical signal. The sensor module 840 may include, for example, at least one of a gesture sensor 840A, a gyro sensor 840B, a barometric pressure sensor 840C, a magnetic sensor 840D, an accelerometer 840E, a grip sensor 840F, a proximity sensor 840G, a color sensor 840H (e.g., a red, green, and blue (RGB) sensor), a biometric sensor 840I, a temperature/humidity sensor 840J, an illumination sensor 840K, and an ultraviolet (UV) sensor 840M. Additionally or alternatively, the sensor module 840 may include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 840 may further include a control circuit to control at least one or more sensors belonging thereto. In one embodiment, the electronic device 801 may further include a processor configured, as a part of the processors 810 or separately from the processors 810, to control the sensor module 840, thereby controlling the sensor module 840 while the processors 810 are in a sleep state. The sensor module 840 may include a configuration that is the same as or similar to that of the sensor unit 130 of FIG. 1.

The input device 850 may include, for example, a touch panel 852, a (digital) pen sensor 854, a key 856, or an ultrasonic input device 858. The touch panel 852 may be, for example, at least one of an electrostatic type, a pressure-sensitive type, an infrared type, and an ultrasonic type. Further, the touch panel 852 may further include a control circuit. The touch panel 852 may further include a tactile layer to provide a user with a tactile response.

The (digital) pen sensor 854 may, for example, be part of the touch panel, or may include a separate recognition sheet. The key 856 may include, for example, a physical button, an optical key, or a keypad. The ultrasonic input device 858 may detect ultrasonic waves generated from an input tool through a microphone (e.g., a microphone 888) and may identify data corresponding to the detected ultrasonic waves.

The display 860 (e.g., the display 760) may include a panel 862, a hologram device 864, or a projector 866. The panel 862 may include a configuration that is the same as or similar to that of the display 760 of FIG. 7. The panel 862 may be configured, for example, to be flexible, transparent, or wearable. The panel 862 may be formed with the touch panel 852 in a single module. The hologram device 864 may display a three-dimensional image in the air using light interference. The projector 866 may project light onto a screen to display an image. The screen may be disposed, for example, inside or outside the electronic device 801. According to one embodiment, the display 860 may further include a control circuit to control the panel 862, the hologram device 864, or the projector 866.

The interface 870 may include, for example, a High-Definition Multimedia Interface (HDMI) 872, a Universal Serial Bus (USB) 874, an optical interface 876, or a D-sub-miniature (D-sub) interface 878. The interface 870 may be included, for example, in the communication interface 770 illustrated in FIG. 7. Additionally or alternatively, the interface 870 may include, for example, a Mobile High-Definition Link (MHL) interface, a Secure Digital (SD) card/Multi-Media Card (MMC) interface, or an Infrared Data Association (IrDA) interface.

The audio module 880 may bidirectionally convert, for example, a sound and an electrical signal. At least some components of the audio module 880 may be included, for example, in the input/output interface 745 illustrated in FIG. 7. The audio module 880 may process sound information input or output, for example, through a speaker 882, a receiver 884, earphones 886, or the microphone 888.

The camera module 891 is a device that takes, for example, a still image and a video. According to one embodiment, the camera module 891 may include one or more image sensors (e.g., a front sensor or a rear sensor), a lens, an Image Signal Processor (ISP), or a flash (e.g., an LED, a xenon lamp, or the like). The camera module 891 may include a configuration that is the same as or similar to that of the camera 140 illustrated in FIG. 1.

The power management module 895 may manage, for example, the power of the electronic device 801. According to one embodiment, the power management module 895 may include a Power Management Integrated Circuit (PMIC), a charger Integrated Circuit (IC), or a battery or fuel gauge. The PMIC may have wired and/or wireless charging methods. The wireless charging methods may include, for example, a magnetic resonance method, a magnetic induction method, or an electromagnetic wave method, and may further include an additional circuit for wireless charging, such as a coil loop, a resonance circuit, or a rectifier. The battery gauge may measure, for example, the remaining battery charge, the charging voltage, the current, or the temperature of the battery 896. The battery 896 may include, for example, a rechargeable battery and/or a solar battery.

The indicator 897 may display the specific state of the electronic device 801 or a component thereof (e.g., the processors 810), which may be, for example, a booting state, a message state, or a charging state. The motor 898 may convert an electrical signal into mechanical vibrations, and may generate vibrations or a haptic effect. Although not shown, the electronic device 801 may include a processing device for supporting a mobile TV (e.g., a GPU). The processing device for supporting the mobile TV may process media data in accordance with Digital Multimedia Broadcasting (DMB), Digital Video Broadcasting (DVB), or mediaFlo™ standards.

Each element mentioned in the present document may include one or more components, and may be designated by different terms depending on the type of the electronic device. In various embodiments, an electronic device may be configured such that at least one of the elements mentioned in the present document is included, such that some elements are omitted, or such that additional elements are further included. Further, some of the elements of an electronic device according to various embodiments may be combined into one entity and may perform the same functions as those of the corresponding elements before the combination thereof.

Figure 9:
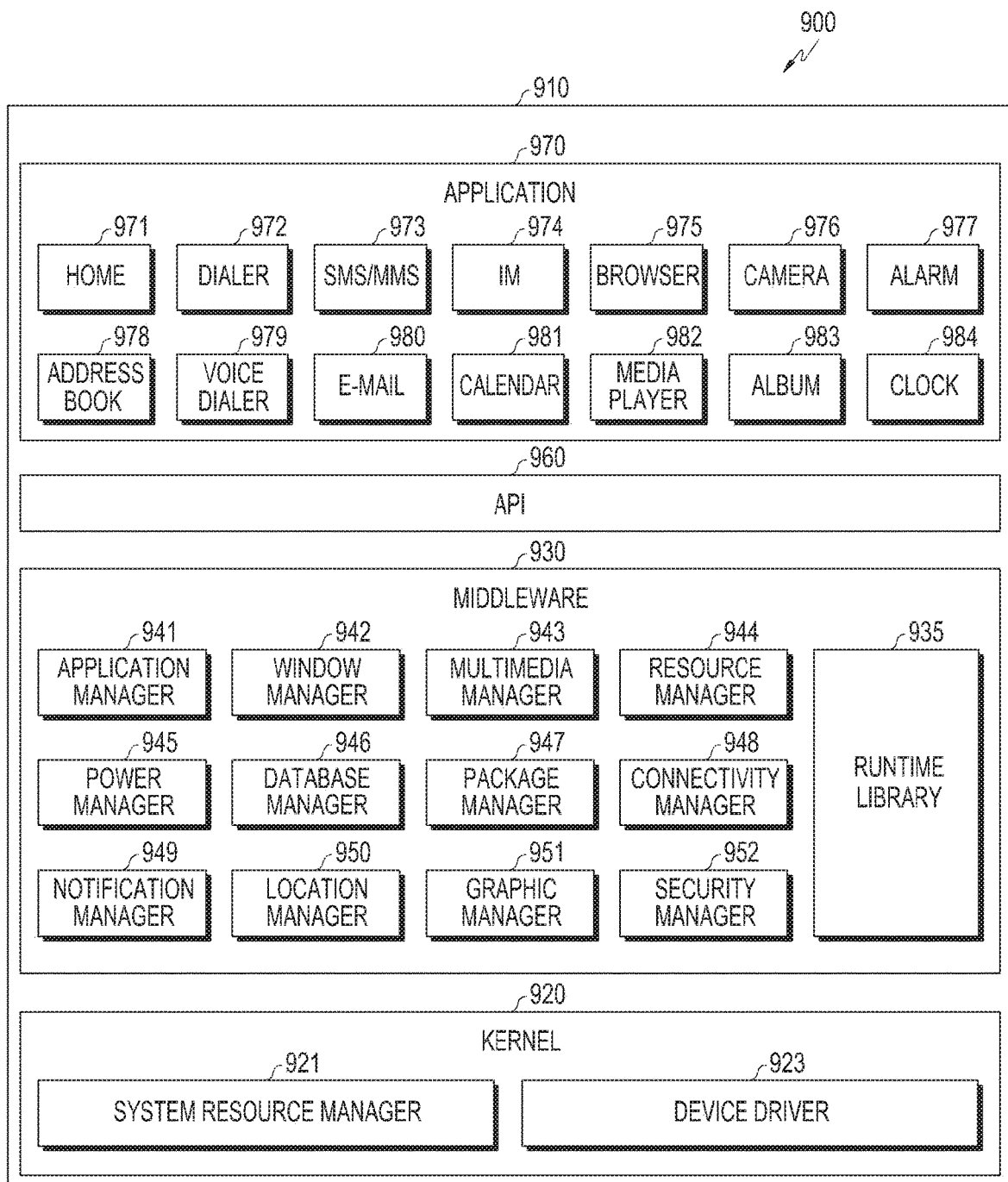
FIG. 9 is a block diagram of a program module according to various embodiments.

FIG. 9 is a block diagram of a program module according to various embodiments. According to one embodiment, the program module 910 (e.g., the program 740) may include an Operating System (OS) that controls resources related to an electronic device (e.g., the electronic device 701) and/or various applications (e.g., the application 747) that run on the OS. The OS may be, for example, Android, iOS, Windows, Symbian, Tizen, Bada, or the like.

The program module 910 may include a kernel 920, middleware 930, an API 960, and/or an application 970. At least part of the program module 910 may be preloaded onto the electronic device or may be downloaded from an external electronic device (e.g., the electronic device 8702 or 704, the server 706, or the like).

The kernel 920 (e.g., the kernel 741) may include, for example, a system resource manager 921 and/or a device driver 923. The system resource manager 921 may perform control, allocation, or recovery of system resources. According to one embodiment, the system resource manager 921 may include a process manager, a memory manager, or a file system manager. The device driver 923 may include, for example, a display driver, a camera driver, a Bluetooth driver, a shared memory driver, a USB driver, a keypad driver, a Wi-Fi driver, an audio driver, or an Inter-Process Communication (IPC) driver.

The middleware 930 may provide, for example, functions commonly needed for applications 970, or may provide the applications 970 with various functions through the API 960 so that the applications 970 may efficiently use the limited systems resources in the electronic device. According to one embodiment, the middleware 930 (e.g., the middleware 743) may include at least one of a runtime library 935, an application manager 941, a window manager 942, a multimedia manager 943, a resource manager 944, a power manager 945, a database manager 946, a package manager 947, a connectivity manager 948, a notification manager 949, a location manager 950, a graphic manager 951, and a security manager 952.

The runtime library 935 may include, for example, a library module used by a complier to add a new function through a programming language while the application 970 is running. The runtime library 935 may perform functions for input/output management or memory management, or arithmetic functions.

The application manager 941 may manage, for example, the life cycle of at least one application among the applications 970. The window manager 942 may manage graphic user interface (GUI) resources used for a screen. The multimedia manager 943 may identify formats that are necessary to play various media files and may encode or decode a media file using a codec suitable for a corresponding format. The resource manager 944 may manage resources, such as source code, memory, or storage space, for at least one application among the applications 970.

The power manager 945 may operate with, for example, a basic input/output system (BIOS) to manage a battery or power supply and may provide information on power necessary for operation of the electronic device. The database manager 946 may generate, retrieve, or change a database to be used for at least one application among the applications 970. The package manager 947 may install or update an application distributed in the form of a package file.

The connectivity manager 948 may manage wireless connectivity via, for example, Wi-Fi or Bluetooth. The notification manager 949 may display or report an incoming message, an appointment, and an event including a proximity notification in a manner that does not disturb a user. The location manager 950 may manage location information on the electronic device. The graphic manager 951 may manage a graphic effect to be provided to the user or a user interface related to the graphic effect. The security manager 952 may provide overall security functions necessary for system security or user authentication. According to one embodiment, when the electronic device (e.g., the electronic device 701) has phone features, the middleware 930 may further include a telephony manager to manage a voice or video call function of the electronic device.

The middleware 930 may include a middleware module that forms combinations of various functions of the foregoing components. The middleware 930 may provide a specialized module for each type of OS in order to provide differentiated functions. Further, the middleware 930 may dynamically delete some existing components or add new components.

The API 960 (e.g., the API 745) is, for example, a set of API programming functions, and may be provided with a different configuration depending on the OS. For example, one API set for each platform may be provided in the case of Android or iOS, while two or more API sets for each platform may be provided in the case of Tizen.

The application 970 (e.g., the application 747) may include one or more applications that are capable of performing functions of, for example, a home screen 971, a dialer 972, SMS/MMS 973, instant messaging (IM) 974, a browser 975, a camera 976, an alarm 977, an address book 978, a voice dialer 979, email 980, a calendar 981, a media player 982, an album 983, a clock 984, health care (e.g., for measuring exercising or blood sugar) or environmental data provision (e.g., for providing atmospheric pressure, humidity, or temperature data), or the like.

According to one embodiment, the application 970 may include an application (hereinafter, "information exchange application" for convenience of description) that supports information exchange between the electronic device (e.g., the electronic device 701) and an external electronic device (e.g., the electronic device 702 or 704). The information exchange application may include, for example, a notification relay application for relaying specific information to the external electronic device or a device management application for managing the external electronic device.

For example, the notification relay application may include a function of relaying notification information, which is generated in another application (e.g., the SMS/MMS application, the email application, the health care application, the environmental data application, or the like) of the electronic device, to the external electronic device (e.g., the electronic device 702 or 704). Additionally, the notification relay application may receive notification information, for example, from the external electronic device and may provide the notification information to the user.

The device management application may manage (e.g., install, delete, or update), for example, at least one function (e.g., a function of turning on/turning off the external electronic device itself (or some components) or adjusting the brightness (or resolution) of a display) of the external electronic device (e.g., the electronic device 702 or 704) communicating with the electronic device, an application operating in the external electronic device, or a service (e.g., a call service or message service) provided by the external electronic device.

According to one embodiment, the application 970 may include an application (e.g., a health care application of a mobile medical device) assigned according to the attributes of the external electronic device (e.g., the electronic device 702 or 704). According to one embodiment, the application 970 may include an application received from the external electronic device (e.g., the server 706 or the electronic device 702 or 704). According to one embodiment, the application 970 may include a third-party application that may be downloaded via a preloaded application or from the server. The illustrated components of the program module 910, according to the embodiments, may be termed differently depending on the OS type.

According to various embodiments, at least part of the program module 910 may be implemented in software, firmware, hardware, or combinations of at least two or more thereof. At least part of the program module 910 may be implemented (e.g., run) by, for example, a processor (e.g., the processor 810). At least part of the program module 910 may include, for example, a module, a program, a routine, sets of instructions, or a process to perform one or more functions.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present invention may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present invention may be implemented by a command stored in a computer-readable storage medium in a programming module form. The instruction, when executed by a processor (e.g., the processor 720), may cause the one or more processors to execute the function corresponding to the instruction. The computer-readable storage medium may be, for example, the memory 730.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present invention, and vice versa.

The programming module according to the present invention may include one or more of the aforementioned components or may further include other additional components, or some of the aforementioned components may be omitted. Operations executed by a module, a programming module, or other component elements according to various embodiments of the present invention may be executed sequentially, in parallel, repeatedly, or in a heuristic manner. Furthermore, some operations may be executed in a different order or may be omitted, or other operations may be added. Various embodiments disclosed herein are provided merely to easily describe technical details of the present invention and to help the understanding of the present invention, and are not intended to limit the scope of the present invention. Accordingly, the scope of the present invention should be construed as including all modifications or various other embodiments based on the technical idea of the present invention.

The invention claimed is:

1. An electronic device having a touch-sensing module comprising:
   a touch-sensing module including a volatile memory;
   a memory including a nonvolatile memory that stores gesture information, in which gesture types based on signal values to be obtained by the touch-sensing module are defined; and
   a host control unit that transmits the gesture information stored in the nonvolatile memory of the memory to the volatile memory of the touch-sensing module in response to the touch-sensing module being reset,
   wherein the touch-sensing module determines a type of gesture input by the user onto the touch-sensing module using the gesture information, which is transmitted from the nonvolatile memory of the memory and stored in the volatile memory of the touch-sensing module.

2. The electronic device of claim 1, wherein the touch-sensing module is reset when the electronic device is booted up, when a screen of the touch-sensing module switches from an off state to an on state, or when the touch-sensing module malfunctions.

3. The electronic device of claim 1, wherein when event information indicating a reset state of the touch-sensing module is received from the touch-sensing module, the host control unit transmits the gesture information stored in the nonvolatile memory to the volatile memory of the touch-sensing module.

4. The electronic device of claim 1, wherein the host control unit obtains information on the type of gesture input by the user, which is recognized using the gesture information, from the touch-sensing module.

5. The electronic device of claim 1,
   wherein the gesture information is gesture information in which gesture types based on pieces of user-input information derived from signal values to be output from a touch panel of the touch-sensing module are defined, and
   wherein the user-input information comprises at least one of a position of a touch, a touch-off position, a number of touches, coordinates of the touch, a touch strength, a touch time, a touch movement speed, a trajectory of the touch, a touch movement direction, an area of the touch, or an angle of the touch based on the user input on the touch-sensing module.

6. The electronic device of claim 1, wherein the touch-sensing module comprises:
   a touch panel that outputs touch signals;
   an interface that performs communication with the host control unit of the electronic device; and
   a touch-sensing module controller that:
      receives gesture information, in which gesture types based on signal values to be output from the touch panel are defined, from the host control unit through the interface, and
      stores the gesture information in the volatile memory of the touch-sensing module when the touch-sensing module is reset.

7. The electronic device of claim 6, wherein the touch-sensing module controller transmits event information indicating a reset state of the touch-sensing module to the host control unit through the interface when the touch-sensing module is reset.

8. The electronic device of claim 6, wherein the touch-sensing module controller:
   determines the type of gesture input by the user onto the touch-sensing module using the gesture information stored in the volatile memory of the touch-sensing module, and
   transmits information on the determined type of gesture to the host control unit through the interface.

9. A method for controlling, by an electronic device, a touch-sensing module, the method comprising:
   maintaining gesture information, in which gesture types based on signal values to be obtained by the touch-sensing module are defined, in a nonvolatile memory of a memory; and
   transmitting the gesture information maintained in the nonvolatile memory of the memory to a volatile memory of the touch-sensing module in response to the touch-sensing module being reset,
   wherein the touch-sensing module determines a type of gesture input by the user onto the touch-sensing module using the gesture information, which is transmitted from the nonvolatile memory of the memory and stored in the volatile memory of the touch-sensing module.

10. The method of claim 9, wherein the touch-sensing module is reset when the electronic device is booted up, when a screen of the touch-sensing module switches from an off state to an on state, or when the touch-sensing module malfunctions.

11. The method of claim 9, wherein the transmitting of the gesture information to the volatile memory of the touch-sensing module comprises transmitting the gesture information stored in the nonvolatile memory to the volatile memory of the touch-sensing module when event information indicating a reset state of the touch-sensing module is received from the touch-sensing module.

12. The method of claim 9, further comprising:

obtaining information on the type of gesture input by the user, which is recognized using the gesture information, from the touch-sensing module.

13. The method of claim 9, wherein the gesture information is gesture information, in which gesture types based on pieces of user-input information derived from signal values to be output from a touch panel of the touch-sensing module are defined, and wherein the user-input information comprises at least one of a position of a touch, a touch-off position, a number of touches, coordinates of the touch, a touch strength, a touch time, a touch movement speed, a trajectory of the touch, a touch movement direction, an area of the touch, or an angle of the touch based on the user input on the touch-sensing module.

14. The method of claim 9, further comprising:

transmitting event information indicating a reset state of the touch-sensing module to a host control unit when the touch-sensing module is reset;

receiving, as a result of transmitting the event information, gesture information, in which gesture types based on signal values to be output from a touch panel of the touch-sensing module are defined, from the host control unit; and storing the received gesture information in the volatile memory of the touch-sensing module.

15. The method of claim 14, further comprising:

determining the type of gesture input by the user onto the touch-sensing module using the gesture information stored in the volatile memory of the touch sensing memory; and transmitting information on the determined type of gesture to the host control unit.

* * * * *